US005388023A

United States Patent [19]

Boy et al.

[11] Patent Number: 5,388,023

[45] Date of Patent: Feb. 7, 1995

[54] GAS-DISCCHARGE OVERVOLTAGE ARRESTER

[75] Inventors: Jürgen Boy; Axel Hahndorff, both of Berlin, Germany

[73] Assignee: Siemens Aktiengesellschaft, Munich, Germany

[21] Appl. No.: 128,422

[22] Filed: Sep. 28, 1993

[30] Foreign Application Priority Data

Apr. 21, 1993 [DE] Germany ............................ 4313651
May 28, 1993 [DE] Germany ............................ 4318366

[51] Int. Cl.$^{6}$ ............................................ H02H 1/04

[52] U.S. Cl. .................................. 361/129; 361/124; 361/119

[58] Field of Search ............... 361/129, 124, 119, 127, 361/120; 337/32, 31

[56] References Cited

U.S. PATENT DOCUMENTS

| | | | |
|---|---|---|---|
| 3,905,006 | 9/1975 | Matsuoka et al. | 338/21 |
| 4,317,101 | 2/1982 | Ellis et al. | 338/21 |
| 4,366,412 | 12/1982 | Lange et al. | 313/325 |
| 4,912,592 | 3/1990 | Flindall et al. | 361/120 |
| 4,984,125 | 1/1991 | Uwano | 361/124 |
| 5,027,100 | 6/1991 | Neuuirth et al. | 337/32 |
| 5,282,109 | 1/1994 | Smith | 361/119 |
| 5,313,183 | 5/1994 | Kasahara | 337/32 |

*Primary Examiner*—Todd E. DeBoer
*Attorney, Agent, or Firm*—Kenyon & Kenyon

[57] ABSTRACT

A gas-filled three-electrode overvoltage arrester may be developed in such a manner that it has dependable "fail-safe" and "vent-safe" behavior. For this purpose, a two-arm spring clip (10) is fastened to the center electrode (1). The ends of the two-arm spring clip (10) rest, with the interpositioning of a spacer (20, 21; 22, 23), against the ends of the end electrodes (2, 3). The end of each arm of the spring clip bears a cap (14, 15) which is provided with a flange-like edge (16, 17). One end of the connecting wire (6, 7) of each end electrode has the shape of a ring (61, 71) which is fastened at the end side to the end electrode. The ring of the connecting wire and the flange-like edge of the cap are opposite each other and are held apart by a disk-shaped fusible pellet (20, 22) and a cylindrical part (21, 23) having insulating properties. The cylindrical part consists either of a temperature-resistant insulating material or of a metal-oxide varistor.

6 Claims, 1 Drawing Sheet

GAS-DISCCHARGE OVERVOLTAGE ARRESTER

BACKGROUND OF THE INVENTION

The present invention relates to the field of electric components and is intended to be used in the construction of gas-discharge overvoltage arresters which, in addition to a center electrode, have two end electrodes and are developed by means of an accessory device so that they have a so-called fail-safe behavior and possibly also a so-called vent-safe behavior.

One known overvoltage arrester of this type includes an annular center electrode, two hollow-cylindrical insulating bodies arranged laterally thereof, and two end electrodes arranged at the ends of the insulating members. A two-arm spring clip is attached to the center electrode, the ends of the two arms resting against the circumference of the two electrodes with the interpositioning of an insulating spacer. A coating of a polyurethane resin is employed as a spacer. This resin coating can melt upon overheating of the arrester, as a result of which the end of the arm of the spring clip comes into contact with the end electrode and thus short-circuits the overvoltage arrester. This property of the overvoltage arrester is referred to as "fail-safe behavior". Furthermore, the ends of the arms of the spring clip are developed with a sharp edge so that a high electric field strength may be developed on these sharp edges. This is of importance when the overvoltage arrester has failed due to a lack of Lightness in the housing. In that case, overvoltages which occur can be discharged subsidiarily via the air discharge gap formed between the sharp end of the arm of the spring clip and the end electrodes. This property of the overvoltage arrester is referred to as "vent-safe behavior" (see U.S. Pat. No. 4,912,592).

In order to produce fail-safe behavior in the case of a three-electrode overvoltage arrester, a construction is also known in which the ends of the arms of the spring clip rest axially rather than radially against the end electrodes, with the interposition of a fusible plastic member. Upon overheating of the arrester, the substantially cylindrical plastic member melts, as a result of which the spring clip comes against the end electrode and thus short-circuits the overvoltage arrester (see U.S. Pat. No. 4,984,125, FIG. 1*a*). In this known embodiment of an overvoltage arrester, both the center electrode and the end electrode are provided with radially extended connecting wires.

For overvoltage arresters having only two electrodes, it is furthermore known to obtain fail-safe behavior by the use of a disk of solder material of low melting point, a contact device which is under axial spring force being clamped against the disk of solder material and being displaced axially upon the melting of the solder disk, thereby short-circuiting the overvoltage arrester. In order to assure the vent-safe behavior, a back-up in the form of an air discharge gap is provided on the one electrode in the case of this known overvoltage arrester (see U.S. Pat. No. 4,366,412).

In the aforementioned three-electrode overvoltage arresters including a spring clip fastened to the center electrode, only a point contact between the spring clip and the end electrodes is formed in the event of thermal overloading of the arrester. In the event of very high short-circuit currents, there is therefore the danger that the ends of the arms of the spring clip will be thermally destroyed.

SUMMARY OF THE INVENTION

The present invention relates to a gas-discharge overvoltage arrester developed such that the spring clip is fastened to the center electrode to establish a dependable contacting which can also carry high currents in the event of an overload. This development makes it possible at the same time to impart "vent-safe properties" to the overvoltage arrester.

In accordance with the present invention, the connecting wire of each end electrode has, on the arrester end, the shape of a ring which is fastened on the end of the end electrode. Furthermore, the end of each arm of the spring clip bears a cap provided with a flange-like edge, the diameter of which corresponds to the diameter of the annular connection. The spacer between each end electrode and the cap consist of a disk-shaped fusible pellet and a temperature-resistant cylindrical part having insulating properties. Additionally, the outside diameter of the fusible pellet and that of the cylindrical part are smaller than the inside diameter of the cap.

With a gas discharge overvoltage arrester developed in this manner, a relatively large contact surface is available in the event of a short circuit. This surface is formed, on the one hand, by the flange-like edge of the cap on the spring clip and, on the other hand, by the ring-shaped part of the connection of the end electrode. If the overvoltage arrester is merely to have a fail-safe behavior, it is preferable to arrange the disk-shaped fusible pellet between the end electrode and the cylindrical part and to use a temperature-resistant insulating material such as plexiglas or ceramic, for instance, for the temperature-resistant cylindrical part. The radial attachment of these two parts is effected in this connection, on the one hand, by the wall of the cap and, on the other hand, by the inner wall of the annular electrode connection.

If the overvoltage arrester is also to exhibit vent-safe behavior, a metal-oxide varistor may be used as the cylindrical part, the response voltage of which is greater than the response voltage of the overvoltage arrester. The ends of the metal-oxide varistor are preferably metallized and the rest of the surface is preferably sealed with a moisture-repelling substance. Depending on the shape of the cap, an insulating intermediate layer can, furthermore, be arranged on the outer surface of the metal-oxide varistor. The use of such a cylindrical part provides assurance that the vent-safe behavior is independent of the humidity of the air, without having to provide for this purpose a special encapsulation of the vent-safe assembly, which is expensive to manufacture. Metal-oxide varistors are readily available commercial components, for example as described in U.S. Pat. No. 3,905,006 and U.S. Pat. No. 4,317,101.

BRIEF DESCRIPTION OF THE DRAWINGS

Three embodiments of a gas-discharge overvoltage arrester according to the present invention are shown in FIGS. 1 to 3.

DETAILED DESCRIPTION

Figure 2:
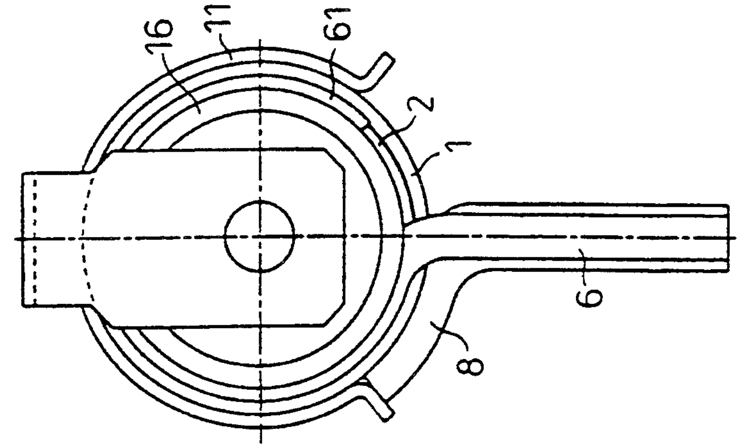
FIG. 2 illustrates an end view of a gas discharge overvoltage arrestor according to an embodiment of the present invention.
Figure 1:
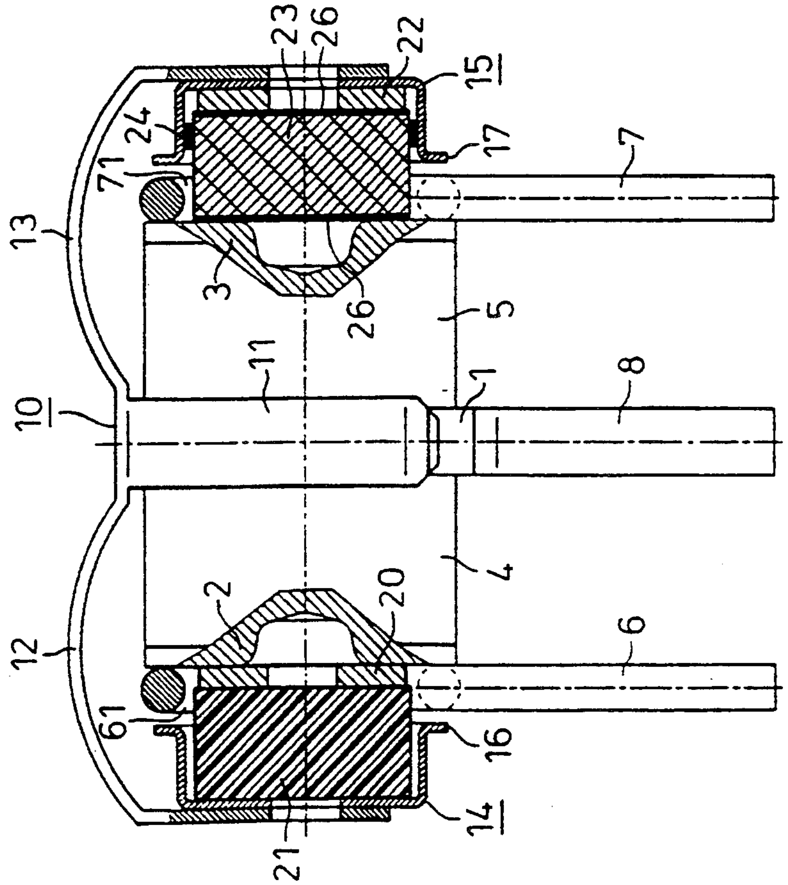
FIG. 1 illustrates a side view of a gas discharge overvoltage arrestor according to an embodiment of the present invention.

In accordance with the side view illustrated in FIG. 1 and the end view illustrated in FIG. 2, the overvoltage arrester consists of an annular center electrode 1, two end electrodes 2 and 3, and insulating hollow cylinders 4 and 5 arranged therebetween. The center electrode 1 is provided with a radially extended connecting wire 8 and the end electrodes 2 and 3 are similarly provided with radially extended connecting wires 6 and 7. However, at the end located on the electrode side, they are formed into an open ring 61 and 71, respectively. This ring is attached firmly to the end of the corresponding end electrode by soldering or welding. Instead of a wire which is shaped into a ring at one end, a corresponding stamping can also be used. Alternatively ring and connecting wire may be different parts welded together.

A two-arm spring clip 10 is fastened on the overvoltage arrester. For this purpose, a centrally arranged clamp 11 is seated in form-locked manner on the center electrode 1. The ends of the two arms 12 and 13 lie in an axial direction of the overvoltage arrester at the end against the end electrodes 2 and 3 with a special development being provided. That is, on the ends of the arms 12 and 13, hollow cylindrical or slightly conically opened caps 14 and 15 are arranged, respectively, which are provided with flange-like edges 16 and 17, respectively. The center diameter of this flange-like edge corresponds to the center diameter of the ring 61 or 71 into which the one end of the connecting wires 6 and 7 respectively is bent.

Between the flange-like edge 16 or 17 and the wire rings 61 or 71 there is a distance of about 0.2 to 0.3 mm, this distance being determined by a fusible pellet 20 or 22 with the shape of an annular disk and a cylindrical part 21 or 23. Cylindrical part 21 is a cylindrical body of temperature-resistant insulating material, for instance of a glass having a base of plastic or of ceramic. The part 21 can in itself also be of a hollow-cylindrical or block shape. The thermal resistance or resistance to heat and insulating property of part 21 are important in order that in the event of an overload of the arrester, only the fusible pellet 20 will melt in a well-defined manner and the flange-like edge 16 will be pressed thereby against the connecting ring 61.

Normally, the overvoltage arrester is provided at both end electrodes 2 and 3 with a fusible pellet 20 and an insulating spacer 21. However, if the arrester is not also to have a "vent-safe behavior", the overvoltage arrester at both end electrodes is equipped in the manner shown for the end electrode 3. In this case, a cylindrical metal-oxide varistor is provided as a spacer 23, its response voltage being greater than the response voltage of the overvoltage arrester. As a response voltage of such a varistor, there applies in all cases that voltage at which the varistor conducts a current of 1 mA. The dimensioning of the varistor, i.e., in particular, the diameter, the height and the selection of the material can be effected by the expert so that the response voltage of the varistor is, for instance, 5 to 10% or else between 10 and 40% above the response voltage of the overvoltage arrester. For dependable operation of the metal-oxide varistor, it is necessary in this connection that its ends be provided with a metallization 26 and that the rest of the surface be sealed with a moisture-repelling substance, for instance by impregnating with a hardenable silicone oil or by immersion in a silicone resin. In the event of the use of a hollow cylindrical cap it is advisable to apply an insulating intermediate layer on the outer surface in order to prevent contact between the outer surface and the cap 15 or the connecting ring 71. Such an insulating intermediate layer can consist of a layer of glass, a layer of plastic in the form of a shrink-down tubing, else a rubber ring. In FIG. 1 a rubber ring 24, which, of course, encloses only a part of the outer surface of the metal-oxide varistor 23, is shown as an insulating intermediate layer. When a cap which is slightly conically open is used, the insulating intermediate layer can be dispensed with, since the varistor then rests against the wall of the cap only with its one end edge in the region of the smallest inside diameter of the cap.

The side view of FIG. 2 shows, in particular, the ring-shaped development of the connecting wire 6 to form an open ring 61, as well as the development of the clamp 11.

Figure 3:
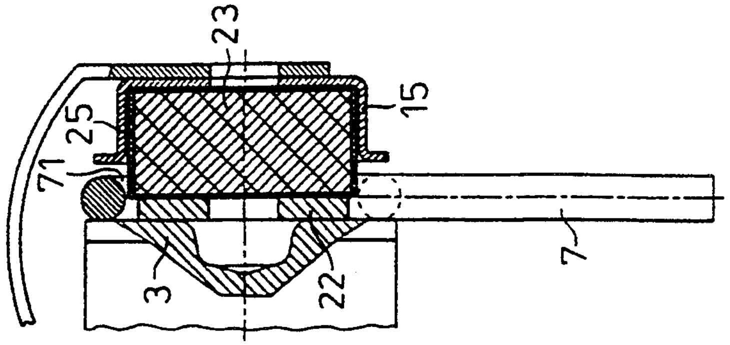
FIG. 3 illustrates a side view of a portion of a gas discharge overvoltage arrestor according to an embodiment of the present invention.

In FIG. 1, the fusible pellet 22 is arranged between the metal-oxide varistor 23 and the cylindrical cap 15. As an alternative, the fusible pellet 22 can also be arranged between the varistor 23 and the end electrode 3, as illustrated in FIG. 3. FIG. 3 also illustrates a layer of glass 25 on the outer surface of the varistor 23, by means of which, on the one hand, the outer surface of the varistor 23 is insulated from the cylindrical part of the cap 15 and from the wire ring 17 and, on the other hand, the varistor is sealed in a moisture-tight manner.

What is claimed is:

1. A gas discharge overvoltage arrester comprising:

two hollow-cylindrical insulating members;

a ring-shaped center electrode arranged between said two hollow-cylindrical insulating members;

two end electrodes respectively arranged at ends of the two hollow-cylindrical insulating members;

a two-arm spring clip fastened on the center electrode in connection with which the ends of the arms rest against the ends of the end electrodes with the interposition of a spacer;

wherein the center electrode and the end electrodes are provided with radially extended connections, the connection of each end electrode at the arrester end has a shape of a ring which is fastened at the end to the end electrode, the end of each arm of the spring clip bearing a cap, the cap being provided with a flange-like edge the diameter of which corresponds to the diameter of the ring-shaped connection; and wherein the spacer between each end electrode and the cap comprises a disk-shaped fusible pellet and a cylindrical part having insulating properties, an outside diameter of the fusible pellet and an outside diameter of the cylindrical part being smaller than an inside diameter of the cap.

2. A gas discharge overvoltage arrester according to claim 1, wherein the cylindrical part comprises a temperature-resistant insulating material and the fusible pellet is arranged between the end electrode and the cylindrical part.

3. A gas discharge overvoltage arrester according to claim 1, wherein the cylindrical part is formed of a metal-oxide varistor, a response voltage of which is greater than a response voltage of the overvoltage arrester, the end sides of the metal-oxide varistor being metallized and the rest of the surface being sealed with a moisture-repelling substance.

4. A gas discharge overvoltage arrester according to claim 3, wherein an insulating intermediate layer is applied to the outer surface of the varistor.

5. A gas discharge overvoltage arrestor according to claim 1, wherein the cylindrical part comprises a temperature resistant insulating material.

6. A gas discharge overvoltage arrestor according to claim 5, wherein the temperature resistant insulating material comprises at least one of a group including plexiglas and ceramic.

* * * * *